United States Patent [19]
Krieg

[11] 3,912,037
[45] Oct. 14, 1975

[54] TRANSPORT VEHICLE FOR A TRANSPORT SYSTEM, IN PARTICULAR FOR ASSEMBLING STRUCTURAL UNITS, FOR EXAMPLE MOTOR VEHICLES, FROM STRUCTURAL ELEMENTS

[75] Inventor: Walter Krieg, Brugg, Switzerland

[73] Assignee: Digitron AG, Brugg-Biel, Switzerland

[22] Filed: Feb. 6, 1974

[21] Appl. No.: 440,032

[30] Foreign Application Priority Data
Feb. 6, 1973 United Kingdom............. 5812/73

[52] U.S. Cl. ............................ 180/98; 280/91
[51] Int. Cl.² .................................. B60K 26/00
[58] Field of Search ............ 180/77, 79.2 C, 98; 318/587; 280/91

[56] References Cited
UNITED STATES PATENTS

| | | | |
|---|---|---|---|
| 2,847,080 | 8/1958 | Zworykin | 180/98 |
| 3,009,525 | 11/1961 | DeLiban | 180/98 |
| 3,039,554 | 6/1962 | Hosking | 180/77 R |
| 3,147,817 | 9/1964 | DeLiban | 180/98 |
| 3,235,024 | 2/1966 | Barrett | 180/77 R X |
| 3,245,493 | 4/1966 | Barrett | 180/77 R X |
| 3,482,644 | 12/1969 | Krieger | 180/98 |
| 3,498,403 | 3/1970 | Kohls | 180/98 |
| 3,596,730 | 8/1971 | Cecce | 180/79.2 C |
| 3,598,196 | 8/1971 | Ballantyne | 180/98 X |
| 3,612,206 | 10/1971 | Ohntrup | 180/98 |

*Primary Examiner*—David Schonberg
*Assistant Examiner*—Terrance L. Siemens
*Attorney, Agent, or Firm*—Woodhams, Blanchard and Flynn

[57] ABSTRACT

In a transportation system comprising a plurality of individual vehicles, intended particularly for assembling structural units such as motor vehicles from component structural elements, there is provided a plurality of such vehicles and means for effecting starting and stopping thereof and for guiding same along a predetermined path. Said vehicles are provided with wheeled supporting structure, certain thereof being pivotal for guidance thereof and at least one selected one thereof carrying an induction sensitive probe arranged to follow a predetermined path emanating electromagnetic signals. Selective means sensitive to predetermined frequencies or combinations thereof are provided for controlling the guidance of said vehicles including starting and stopping thereof.

12 Claims, 9 Drawing Figures

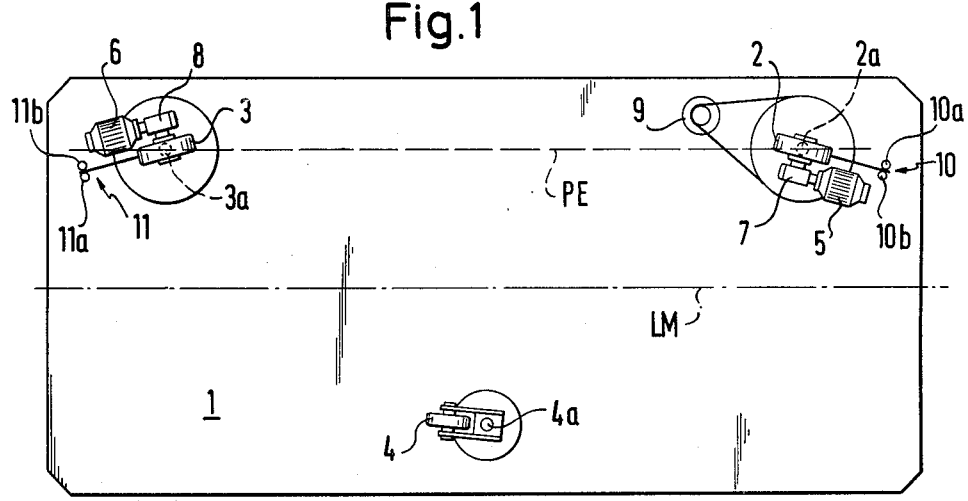
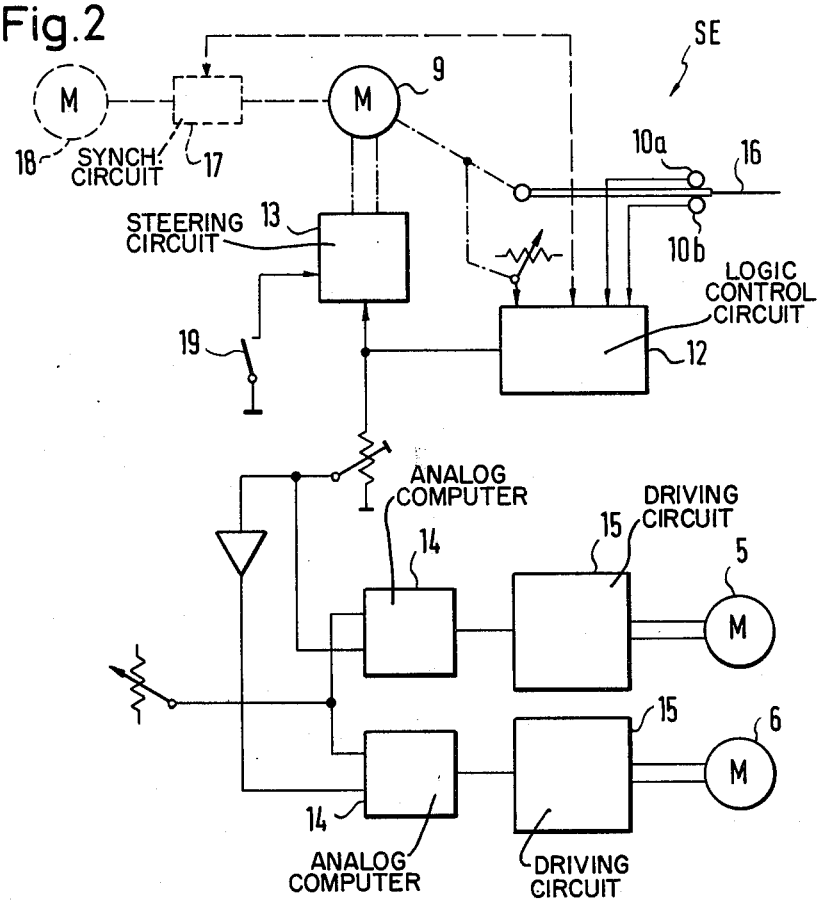

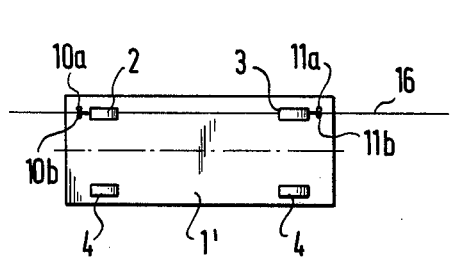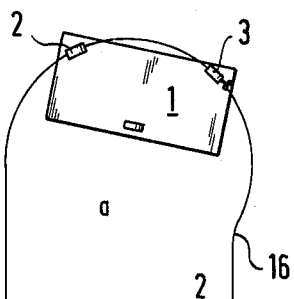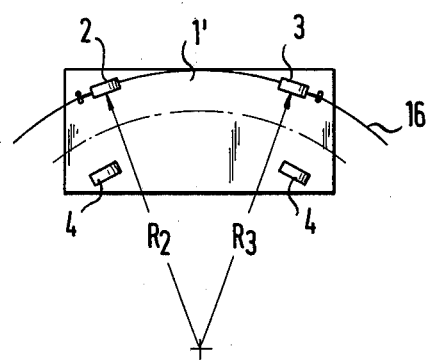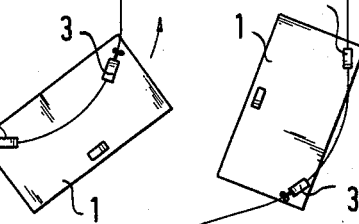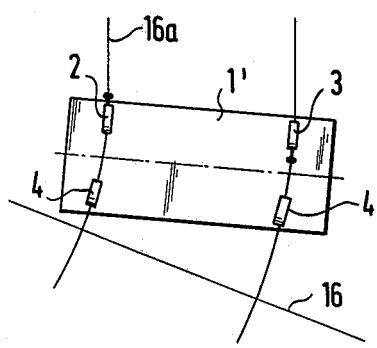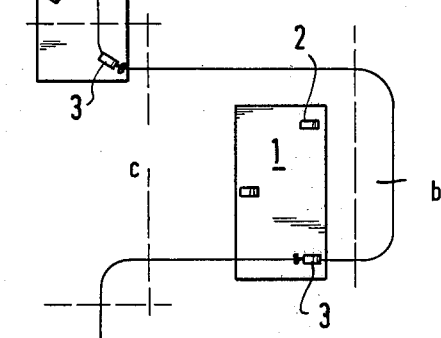

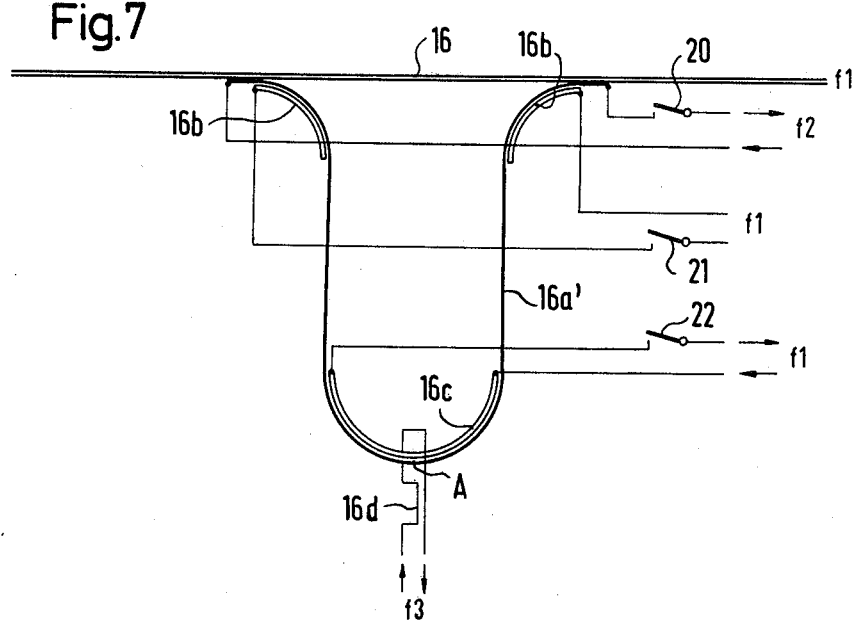
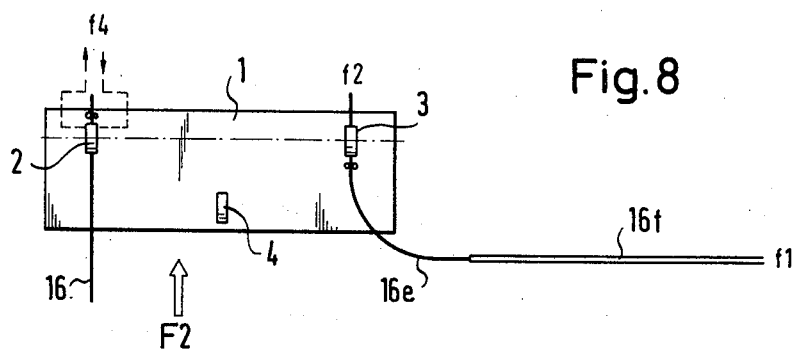
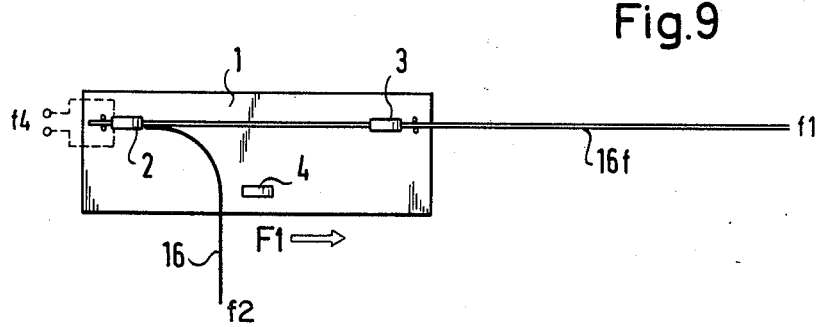

TRANSPORT VEHICLE FOR A TRANSPORT SYSTEM, IN PARTICULAR FOR ASSEMBLING STRUCTURAL UNITS, FOR EXAMPLE MOTOR VEHICLES, FROM STRUCTURAL ELEMENTS

FIELD OF THE INVENTION

This invention relates to a transport vehicle for a transport system, in particular for assembling structural units, for example motor vehicles, from structural elements, if desired, with a plurality of transport vehicles being respectively controlled along a predetermined path of movement by means of a signal generating system effective in those regions, each transport vehicle including: a signal receiver, at least three wheels which may be pivoted about approximately vertical, mutually spaced steering axes and a motor-driven driving and steering system for at least two of said wheels, said driving and steering system being controllable both with respect to the speed as well as the angle of turn of the driving or driven wheels by means of the signal receiver in response to control signals produced by the signal generating system.

BACKGROUND OF THE INVENTION

A transport system of the afore-cited type offers the great advantage that the individual parts or structural elements for the assembly of structural units, for example motor vehicles, no longer have to be transported on an assembly belt passing along a production line, but may be transported on individual transport vehicles, thereby eliminating the assembly belts. These transport vehicles may be controlled along the production line as well as in adjacent working stations branching off therefrom and, from there, back again to the production line, thereby eliminating the necessity of making the workers maintain a fixed working tempo during the manufacturing process and thereby making it possible to operate in the framework of the manufacturing process either individually or, preferably, in work groups, each of which is capable of making its own decisions and assuming responsibility. The result is that not only are the physical as well as physiological stresses on the human worker reduced and his output capacity considerably increased, but previous shutdowns of the assembly belt in the case of large-scale assembly defects or malfunction in one of the work stations are eliminated. Due to this fact and due to other advantages as well, for example pertaining to the reduction in the amount of disruption caused by sickness on the part of the personnel, all prerequisites are present for a transport system of the afore-cited type for an increase in the economy of the manufacturing process and consequently for a relatively rapid amortization of the investment expenses which are higher than in an assembly line system.

In this context, the object of the present invention is to reduce to a low optimum figure the investment expenses for a transportation system of the type cited at the outset by means of simple constructional measures.

SUMMARY OF THE INVENTION

This object is accomplished in accordance with the invention in that two driving wheels are arranged on the transport vehicle which have steering axes lying in an imaginary plane disposed parallel to the center longitudinal axis of the vehicle.

This measure may be accomplished during the manufacture of the transport vehicles without incurring any additional expenditure and ensures considerable advantages. In economical quantity production series, all driving wheels of the transport vehicles are designed with the same dimensions so that a substantial reduction in the investment expenses is quaranteed for the transportation system. Since the two driving wheels of every transport vehicle may operate in regular curved areas in the path of movement, if desired, with equal radii from the respective center of curvature, no complicated steering geometry is involved so that computer control of the angle of turn and speeds of the driving wheels may be economized. The motor-driven driving and steering system is thus simple in construction and consequently economic in manufacture with optimum operational safety and only requires inexpensive servicing.

In a preferred embodiment of the transport vehicle, the signal receiver is equipped for each driving wheel with signal receiving and sensing elements which are arranged to pivot together with the respective associated driving wheel to follow the arc of a turn, the signal receiver being preferably designed to be energized by the signals of the signal generating system to selectively effect a positive connection of the sensing elements to the driving and/or turning motor of the respective driving wheel. This arrangement of the sensing elements, which allows them to pivot together with the associated driving wheel, makes it possible to compensate very quickly and very exactly for even slight deviations of the driving wheels from the predetermined path of movement which is caused, for example, by a control line or induction loop of the signal generator system which is imbedded in or on the ground of the production plant, thereby enabling the driving wheels to be guided exactly parallel to the control line or induction loop of the signal generating system, i.e. exactly parallel to the predetermined path of movement, if desired, with continuous corrections of low amplitude and relatively rapid oscillation.

An especially sensitive parallel control of the driving wheels may be achieved with respect to the control line or induction loop of the signal generating system in that the sensing elements are respectively formed by two induction coils with parallel axes which are secured on the wheel bearing or suspension in a radial spacing from the steering axis of the associated driving wheel and, if desired, are symmetrically disposed with respect to the central radial plane of the associated driving wheel.

Due to the fact that a complicated steering geometry is advantageously omitted in the transport vehicle, it is also possible and is also provided in a preferred embodiment that the motor-driven driving and steering system of the two driving wheels is associated with transmission means, at least for transmitting the angle of turn, for example a mechanical or electrical synchronizing circuit and the signal receiver is designed to be controlled by the signals of the signal generating system in, among others, switching positions in which the transmission means are effectively energized and in which the one driving wheel assumes the function of a master wheel in positive connection with the associated sensing elements and alternately the other driving wheel assumes the function of a slave wheel. By controlling the slave wheel by the master wheel in this manner, it is possible to steer only the latter by means of the signals in the control line or induction loop of the signal generating system which is advantageous, in particular with major changes in direction in the path of movement, for example in a 90° turn, since a single control line or induction loop is sufficient for this purpose.

BRIEF DESCRIPTION OF THE DRAWINGS

One embodiment of the invention will now be more fully described with reference to the accompanying drawings in which:

FIG. 1 is a schematic underside view of a transport vehicle of the type described hereinbefore, FIG. 2 is a block circuit diagram of a signal receiver of the transport vehicle, FIGS. 3 to 5 are respectively reduced schematic underside views of the transport vehicle on a path of movement extending parallel to, curved or transverse with respect to the central longitudinal axis of the vehicle, FIG. 6 is a schematic view of various basic functions of the steering control of the vehicle, FIG. 7 is a schematic top elevation of a control line assembly for determining the path of movement of the transport vehicle, and FIGS. 8 and 9 are respectively schematic illustrations of possibilities for changing the path of movement of the transport vehicle.

DETAILED DESCRIPTION

Referring to FIG. 1, a transport vehicle 1 is designed with an elongated shape and includes at least three wheels 2, 3, 4 which are respectively rotatably journaled in associated wheel bearings or suspension means so as to be pivotal on the underside of the transport vehicle 1 about an approximately vertical steering axis 2a or 3a or 4a. The steering axes 2a and 3a extend through the axis of rotation of the associated wheel 2 or 3, whereas the wheel 4 is a castor wheel having a steering axis 4a extending in spaced relation to the axis of rotation.

The transport vehicle 1 has associated therewith a motor-powered driving and steering system for the two wheels 2, 3. Two driving motors 5, 6 with associated reduction gearing 7, 8 are illustrated in FIG. 1 and are each associated with one of the wheels 2, 3. These therefore fulfill the function of driving wheels on the vehicle 1 which may be controlled in a manner explained hereinafter with respect to the angles to turn about the associated steering axis 2a or 3a by means of the motor-driven driving and steering system. A steering motor 9 of the driving wheel 2 is schematically indicated in FIG. 1.

As shown by FIG. 1, the two driving wheels 2, 3 are arranged with their axes of rotation 2a, 3a on the transport vehicle 1 in an imaginary plane PE extending parallel to the median longitudinal axis LM thereof and are equipped respectively with associated signal receiving or sensing elements 10 or 11 which are secured to the wheel bearing or suspension means of the associated driving wheel 2 or 3 with radial spacing relative to the steering axis 2a or 3a. The sensing elements 10, 11 thus pivot together with the associated driving wheel 2 or 3 parallel to the steering axis 2a or 3a thereof and are associated with a signal receiver SE which is also disposed on the transport vehicle 1 although not shown in FIG. 1 and will be described more fully hereinafter in conjunction with FIG. 2.

In the embodiment, the sensing elements 10, 11 each consist of two axis parallel induction coils 10a, 10b or 11a, 11b and are symmetrically disposed relative to the radial central plane of the associated driving wheel 2 or 3 such that, in the case of a path of movement of the vehicle 1 which extends approximately parallel to the central longitudinal axis LM of the vehicle, these sensing elements 10 or 11 of the front driving wheel 2 or 3 run ahead of this path of movement.

The afore-cited signal receiving means SE in accordance with FIG. 2 includes a logic control circuit 12 for the motor-driven driving and steering system. Only the driving motor 5 and the steering motor 9 of the wheel 2 as well as the driving motor 6 of the wheel 3 are schematically illustrated in FIG. 2. The control circuit 12 controls the steering motor 9 via a steering circuit 13 and the driving motors 5, 6 via an analog computer 14 and driving circuits 15 associated with these motors in response to control signals produced by a signal generating system which is illustrated by a current-carrying wire or induction loop 16 in FIG. 2. This is positioned in or on the ground or floor of the production plant along a predetermined path of movement for the transport vehicle 1.

The control circuit 12 can be influenced by the signals of the induction loop 16 via the sensing elements 10, 11. Only the induction coils 10a, 10b are shown in FIG. 2 in a controlling positive connection circuit with the steering motor 9 of the associated driving wheel 2. The signal receiver SE is designed such that the sensing elements 10, 11 are selectively switchable by corresponding signals of the signal generating system in controlling positive connection with the driving and/or steering motor of the associated driving wheel 2 or 3. This selective position connection of the sensing elements 10, 11 to the steering motor of the respective driving wheel 2 or 3 makes it possible to design the signal receiving means SE to be switchable by corresponding signals of the signal generating system such that in an alternating manner the one driving wheel selectively assumes the function of a master wheel in positive connection circuit with the associated induction coils of the sensing elements and the other driving wheel assumes the function of a slave wheel. At least with respect to the angle of turn, the two driving wheels 2, 3 may be coupled by transmission means which may comprise, for example, a mechanical synchronizing circuit or, as illustrated in FIG. 2 by the dotted lines, an electric synchronizing circuit 17 between the steering motor 9 of the driving wheel 2 and a steering motor 18 of the driving wheel 3.

The signal receiving means SE is designed to be selectively switchable for three basic functions a, b, c, by corresponding signals of the signal generating system while excluding the transmission means 17. In the basic function mode a, the angle of turn of the respective master wheel is transmitted antiparallel and, in the basic function mode b, is transmitted parallel to the respective slave wheel while in the basic function mode c the two driving wheels 2, 3 are fixed in a position which is angularly displaced by 90° relative to the central longitudinal axis LM of the respective transport vehicle 1. These wheels may be fixed, for example, by blocking the steering control circuit 13 by means of a switch 19. In this blocking position of the steering control circuit 13, the signal receiver SE individually regulates at least one of the driving motors 5 or 6 of the two driving wheels 2, 3 with respect to their speed in a manner which will be described hereinafter.

FIG. 3 shows a transport vehicle 1' comprising two non-steerable wheels 4 in a rectilinear area of the induction loop 16. As long as the sensing elements 10a, 10b or 11a, 11b of the respective driving wheel 2 or 3, whichever is in front depending on advance or reverse travel of the vehicle 1', is acted on with the same intensity by the electromagnetic signals of the induction loop 16, i.e. as long as there is a substantially equal spacing relative to the latter, no control signals are transmitted to the steering motor of the respective master wheel by the signal receiver SE. Not until the electromagnetic equilibrium of both induction coils is interrupted, for example due to a deviation of the transport vehicle 1' from the predetermined path of movement are corresponding signals produced by the control circuit 12 which are transmitted to the steering motor of the respective master wheel until the induction coils associated with the latter are once again acted upon by the electromagnetic signals of the induction loop 16 with the same intensity.

FIG. 4 shows the transport vehicle 1' in a curved area of the path of movement and it can be seen that the driving wheels 2, 3 have a substantially equal radial spacing relation R2, R3 from the central point of curvature of the induction loop 16 and, consequently, run at the same speed in a simple steering geometry with equal wheel diameters.

While the angle of turn of the wheels 2, 3 is controlled in the switching position for basic function a, i.e. antiparallel, by the signal receiver SE in a continuously curvilinear or curved path of the induction loop 16 in accordance with FIGS. 3 and 4, FIG. 5 shows a parallel control of the driving wheels 2, 3 in the switching position of the signal receiver SE for the basic function b which permits a transverse displacement of the transport vehicles 1' from the continuous induction loop 16 along a control or induction line 16a of the signal generating system which intersects this curved portion. If, as is illustrated in FIG. 5, the control line 16a again proceeds rectilinearly at the end of the curved portion, the transport vehicle 1' is conducted in the manner described hereinabove by individually regulating the speed of at least one of the driving wheels 2, 3 in the switching position for the signal receiver SE for the basis function c.

FIG. 6 shows the control of the angles of turn of the transport vehicle 1 according to the three basic functions a, b, c of the signal receiver SE in response to the respective direction of the induction loop 16 of the signal generating system. In the regions of the induction loop 16 which extend a continuously curved manner and in a rectilinearly manner in the upper half of FIG. 6, the induction loop is acted on by a first frequency f1 which causes the signal receiver SE of the transport vehicle 1 to be switched into the position for basic function a, the driving wheel 3 which is in front in the direction of travel assuming the function of the master wheel whose angle of turn relative to the axis LM is nonparallel to the angle of turn of the slave wheel 2 relative to the axis LM. Both driving wheels 2, 3 follow substantially the rectilinear or uniformly curved path of the loop.

At the end of the latter, namely at the bottom of FIG. 6, the induction loop 16 forms a U-shape having several 90° turns in which the first frequency f1 is superimposed on a second frequency f2 to define a third signal. This third signal causes the signal receiver SE to be switched into the condition for the basic function b whose zones are defined in the drawing by the dash lines. As has already been explained hereinabove, the angles of turn of the master wheel 3 are transferred parallel to the slave wheel 2 in these regions of basic function b so that the transport vehicle 1 is moved in those regions of the induction loop 16 with 90° turns not only in a longitudinal direction, but transversely thereto as well.

In between the areas of force of basic function b, the induction loop 16 is acted on in the rectilinear area only by the second frequency f2 which causes the signal receiver SE to be switched into the position for basic function c. In this function, both driving wheels 2, 3 of the transport vehicle 1 are fixed in a position which is angularly displaced by 90° relative to the central longitudinal axis, as was already explained hereinbefore, and the speeds of at least one driving wheel are individually regulated such that the transport vehicle 1 is moved in a transverse direction exactly parallel to the path of the induction loop 16.

FIG. 7 with reference to FIG. 6 shows a rectilinear region of the induction loop 16 having an auxiliary control line or auxiliary loop 16a' which branches off the induction loop 16 in a 90° curved region, executes a 180° turn about a working station A and returns again to the rectilinear region of the induction loop 16 in another 90° curved region and which is also selectively acted upon by the second frequency f2 via a switch 20. In the 90° curved region of the auxiliary loop 16a' another auxiliary loop 16b extends parallel thereto and is acted upon by the first frequency f1 via a switch 21. In the 180° turn area of the auxiliary loop 16a', a third auxiliary loop 16c extends parallel thereto and is acted upon by the first frequency f1 via an associated switch 22. The various basic functions a, b, c of the signal receiver SE of the respective transport vehicle are activated in the manner described hereinbefore in conjunction with FIG. 6.

The signal receiver SE, however, is designed to stop the driving motors 5, 6 for the driving wheels 2, 3 by means of a third frequency f3 so that the transport vehicle can be stopped when it reaches the working station A by arranging a fourth induction loop 16d in the region of the working station A and by supplying the third frequency f3 which acts upon this loop. As soon as the application of this frequency to the fourth auxiliary line 16d is interrupted, the driving motors 5, 6 of the transport vehicle are again driven by the signal receiver SE in an advance movement of the transport vehicle along the auxiliary control line 16a' to the induction loop 16.

In the event that the transport vehicle, however, is not supposed to follow the U-shaped path of the auxiliary control line 16a', but is supposed to continue along the rectilinear path of the induction loop 16, the switches 20, 21, 22 remain open.

Further possibilities of changing the direction of the path of movement for the transport vehicle 1 are illustrated in FIGS. 8 and 9. Referring to FIG. 8, the transport vehicle 1 is moved in the direction of the arrow F2 along the induction loop 16 according to basic function c until the sensing elements of the driving wheel 2 receive a fourth frequency f4. This causes the effective control connection between the sensing elements of the driving wheel 2 and the steering motor to be eliminated and an effective connection circuit between the sensing elements of the wheel 3 and the steering motor to be produced. The driving wheel 3 is located above a 90° curved section of an auxiliary induction line 16e which is under the influence of the first frequency f1 and a second frequency f2 superimposed upon the first so that the transport vehicle 1 follows the auxiliary induction line 16e according to basic function c until this merges into a rectilinear region of an induction line 16f which is under the influence of the first frequency f1 so that the transport vehicle 1 is advanced further according to basic function a.

Referring to FIG. 9, the transport vehicle 1 is first moved along the induction loop 16 according to basic function b by allowing both the first frequency f1 and the superimposed frequency f2 to act thereupon. As soon as the sensing elements of the driving wheel 2 reach the effective area of the fourth frequency f4, they are de-energized in the manner described hereinbefore and the sensing elements of the driving wheel 3 are brought into effective control connection with the steering motor thereof. The transport vehicle 1 may then be moved in the direction of the arrow F1 along the auxiliary control line 16f which is under the influence of the first frequency f1 according to the basic function a, the driving wheel 3 assuming the function of the master wheel whose angles of turn are transferred antiparallel to the driving wheel 2 or to the slave wheel.

This invention is not restricted to the embodiment according to the drawing. It would also be possible to arrange the driving wheels on various areas of the length of the transport vehicle, diagonal for example, and/or to design the signal receiver SE to be activated such that the one driving wheel assumes the function of the master wheel even when the transport vehicle follows a path of movement extending transversely to the central longitudinal axis of the vehicle. This master wheel then controls the angles of turn of the second driving wheel or of the slave wheel in parallel by means of the transmission means, thereby achieving an especially sensitive steering control.

What is claimed is:

1. A vehicle having a steering mechanism for causing said vehicle to follow a current-carrying wire, comprising:
   at least three wheel means pivotal about parallel axes to effect a movement of said vehicle in a multitude of different directions, at least two of said wheel means having steering axes which intersect said current-carrying wire and selectively activated driving means connected thereto for rotatably driving said two wheel means, said steering axes of said two of said wheel means being contained in a theoretical plane spaced laterally from and parallel to a longitudinal centerline for said vehicle, the third one of said wheel means being located on the opposite side of said longitudinal centerline from said two wheel means;
   selectively activated steering means for selectively pivoting each of said two wheel means about its respective steering axis to control the direction of travel of said vehicle along a path defined by said current-carrying wire; and
   signal receiver means mounted on at least one of said two wheel means for sensing deviation of said vehicle from said wire and operable in association with said selectively activated steering means to control the direction of travel of at least one of said two wheel means so that said steering axis of said one of said two wheel means is maintained in said intersecting relationship to said current-carrying wire.

2. A vehicle according to claim 1, wherein said signal receiver means are secured to said one of said two wheel means and are pivotal therewith about said steering axis therefor.

3. A vehicle according to claim 1, wherein the signal receiver means includes signal sensing elements which, depending on whether the vehicle is travelling forward or backward, are arranged to precede said wheel means.

4. A vehicle according to claim 3, wherein said signal sensing means sense signals from said current-carrying wire and feed same to a control circuit, said steering means being responsive to said control circuit to control said steering means and, consequently, the direction of travel of said vehicle.

5. A vehicle according to claim 4, wherein said sensing elements comprise two parallel axis induction coils secured to a wheel support structure on said wheel means and in a radial spaced relation from said steering axis therefor.

6. A vehicle according to claim 5, wherein said two induction coils are symmetrically disposed with respect to a central radial plane of a wheel on said wheel means.

7. A vehicle according to claim 1, wherein said steering means for each of said two wheel means includes a steering motor, said steering motors being selectively controlled by said control circuit.

8. A vehicle according to claim 7, wherein said control circuit includes a steering circuit for selectively controlling said steering motors in response to signals from said signal sensing elements.

9. A vehicle according to claim 8, wherein said control circuit includes a synchronizer means for coordinating a simultaneous operation of both of said steering motors.

10. A vehicle according to claim 9, wherein said current-carrying wire has a control line mounted adjacent thereto and a signal generator connected in circuit therewith to supply a signal thereto;
    wherein said signal sensing means detect said signal on said control line and feed said signal to said control circuit, said control circuit energizing said synchronizer means for coordinating a simultaneous operation of said steering motors so that the radial planes of said wheels on said wheel means are moved to positions of:
    a. nonparallelism,
    b. parallelism, and
    c. 90° to said longitudinal centerline of said vehicle.

11. A vehicle according to claim 10, including three separate control lines mounted adjacent to said current-carrying wire, each having a separate signal generator connected in circuit therewith to supply, respectively, first, second and third signals thereto;
    wherein said signal sensing means detect said first, second and third signals each time they are moved into coupling association therewith, said control circuit effecting a simultaneous movement of said steering motors and, consequently, said wheels on said wheel means to said positions of:
a. nonparallelism in response to said first signal;
b. parallelism in response to said second signal; and
c. 90° to said longitudinal centerline of said vehicle in response to said third signal.

12. A vehicle according to claim 11, wherein said first, second and third signals are separate and distinct frequency signals.

* * * * *